United States Patent
Ohkuma et al.

(10) Patent No.: US 7,782,766 B2
(45) Date of Patent: Aug. 24, 2010

(54) DATA COLLECTION SYSTEM AND DATA COLLECTION METHOD

(75) Inventors: Takahiro Ohkuma, Tokyo (JP);
Daisuke Kawasaki, Tokyo (JP);
Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1596 days.

(21) Appl. No.: 10/942,043

(22) Filed: Sep. 16, 2004

(65) Prior Publication Data
US 2005/0063326 A1   Mar. 24, 2005

(30) Foreign Application Priority Data
Sep. 19, 2003   (JP)   ............... 2003-327053

(51) Int. Cl.
*H04L 1/10*   (2006.01)
(52) U.S. Cl. ............ 370/229; 455/456.1; 455/574
(58) Field of Classification Search ............ 370/347, 370/348, 343; 375/211
See application file for complete search history.

(56) References Cited

U.S. PATENT DOCUMENTS

| | | | | |
|---|---|---|---|---|
| 4,956,772 | A * | 9/1990 | Neches | 719/313 |
| 7,047,051 | B2 * | 5/2006 | Sackett et al. | 455/574 |
| 2002/0039904 | A1 * | 4/2002 | Anderson | 455/456 |
| 2002/0083260 | A1 * | 6/2002 | McCormick et al. | 710/316 |
| 2002/0114273 | A1 * | 8/2002 | Tobita et al. | 370/229 |
| 2006/0111103 | A1 * | 5/2006 | Jeong et al. | 455/434 |

* cited by examiner

FOREIGN PATENT DOCUMENTS

| JP | 63-173437 | 7/1988 |
|---|---|---|
| JP | 6-103482 | 4/1994 |
| JP | 2001-136294 A | 5/2001 |

OTHER PUBLICATIONS

Japanese Office Action dated Nov. 11, 2008 with partial English-Language Translation.
Michimune Kohno et al., Journal of the Institute of Electronics and Communication Engineering (J82-A) No. 3 "Components of an Adaptive Sensor Network" Institute of Electronics and Communication Engineering Incorporated, Mar. 25, 1999, No. J82-vol. A, No. 3, pp. 454 to 462.

*Primary Examiner*—Charles N Appiah
*Assistant Examiner*—Joy K Contee
(74) *Attorney, Agent, or Firm*—McGinn IP Law Group, PLLC

(57) ABSTRACT

The present invention relates to a data collection system and a data collection method in a sensor network, enabling sensor modules to consume lower amounts of power. The base station transmits data collection request signals to one or more sensor modules which are lower than the base station by 1 in a tree structure. Each sensor module which has received the data collection request signal transfers the signal to one or more sensor modules which are lower than the module by 1. The base station regards the transfer of the signal as ACK for the data collection request signal transmitted therefrom to the sensor module which is lower than the base station by 1. The transmission of a data collection acknowledgement signal starts from a sensor module at the low-order end. When a sensor module receives the data collection acknowledgement signal from a downstream sensor module which is lower than the module by 1, the module transmits the signal to an upstream sensor module which is higher than the module by 1. The downstream sensor module regards the transmission of the signal as ACK for the data collection acknowledgement signal transmitted therefrom, and enters standby mode. In this manner, the sensor modules enter standby mode in sequence starting from the sensor module at the low-order end. Thereby, it is possible to achieve reductions in the frequency of signal transmission while maintaining reliable data communication. Thus, each module consumes lower amounts of power.

37 Claims, 9 Drawing Sheets

F I G. 1
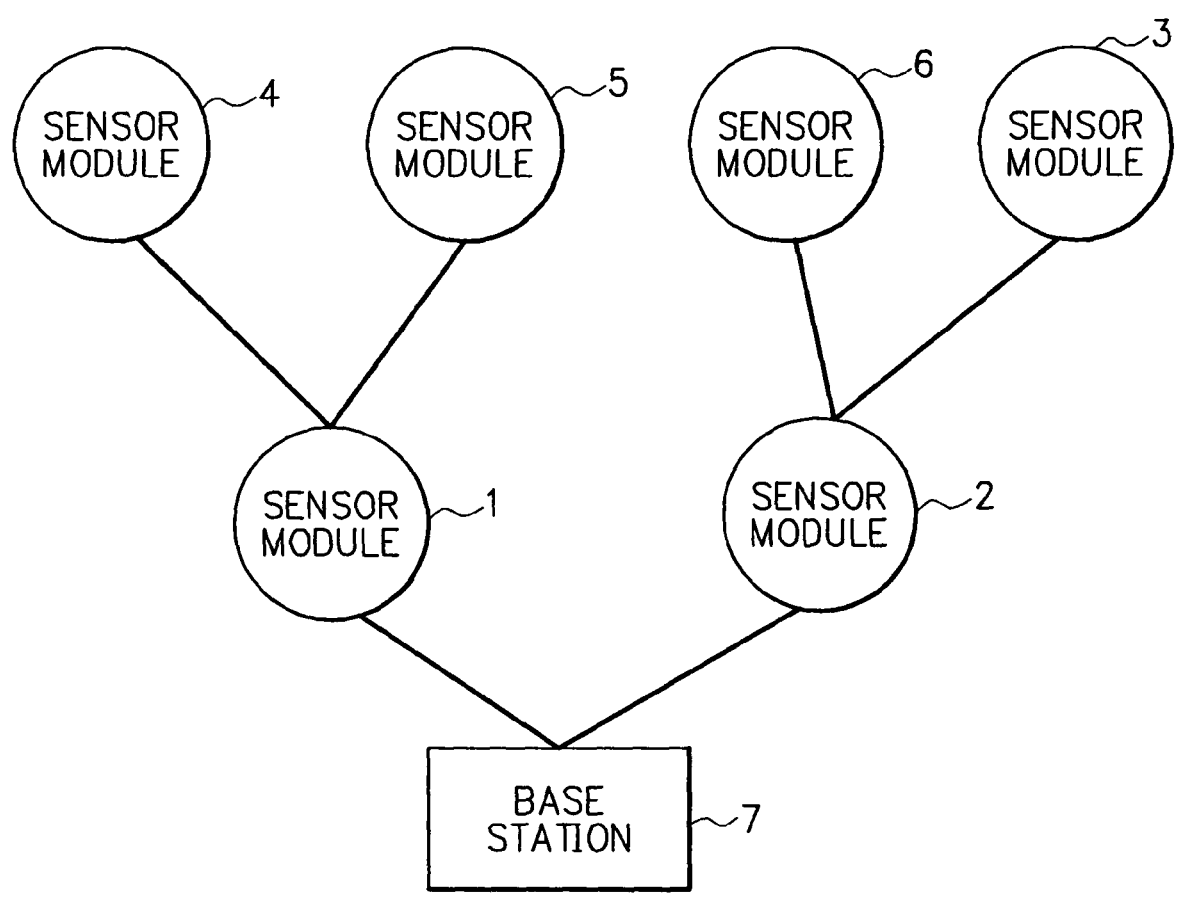

FIG. 2

2-7: ROUTING INFORMATION FOR BASE STATION 7

| | |
|---|---|
| UPSTREAM MODULE ID | |
| DIRECT SUBORDINATE MODULE ID | 1, 2 |
| OTHER DOWNSTREAM MODULE ID | 3, 4, 5, 6 |

2-1: ROUTING INFORMATION FOR MODULE 1

| | |
|---|---|
| UPSTREAM MODULE ID | 0 |
| DIRECT SUBORDINATE MODULE ID | 4, 5 |
| OTHER DOWNSTREAM MODULE ID | |

2-2: ROUTING INFORMATION FOR MODULE 2

| | |
|---|---|
| UPSTREAM MODULE ID | 0 |
| DIRECT SUBORDINATE MODULE ID | 3, 6 |
| OTHER DOWNSTREAM MODULE ID | |

2-3: ROUTING INFORMATION FOR MODULE 3

| | |
|---|---|
| UPSTREAM MODULE ID | 2 |
| DIRECT SUBORDINATE MODULE ID | |
| OTHER DOWNSTREAM MODULE ID | |

2-4: ROUTING INFORMATION FOR MODULE 4

| | |
|---|---|
| UPSTREAM MODULE ID | 1 |
| DIRECT SUBORDINATE MODULE ID | |
| OTHER DOWNSTREAM MODULE ID | |

2-5: ROUTING INFORMATION FOR MODULE 5

| | |
|---|---|
| UPSTREAM MODULE ID | 1 |
| DIRECT SUBORDINATE MODULE ID | |
| OTHER DOWNSTREAM MODULE ID | |

2-6: ROUTING INFORMATION FOR MODULE 6

| | |
|---|---|
| UPSTREAM MODULE ID | 2 |
| DIRECT SUBORDINATE MODULE ID | |
| OTHER DOWNSTREAM MODULE ID | |

DATA COLLECTION SYSTEM AND DATA COLLECTION METHOD

FIELD OF THE INVENTION

The present invention relates to a data collection system and a data collection method in a sensor network.

BACKGROUND OF THE INVENTION

In conventional radio communication, an acknowledgement (ACK) signal is used to maintain the reliability of data transmission. When a module transmits data to another module, the ACK signal is generally sent to the module at the transmitting end. The ACK signal only indicates that the module at the receiving end has received the data properly.

As an example of conventional techniques, Japanese Patent Application laid open No. S63-173437 has disclosed a "Multiple Address Communication System". In the multiple address communication system, a function for collecting the ACK signals is distributed to one or more branch nodes in a communication tree, which participate in broadcasting. Having received the ACK signals from all its downstream nodes in the communication tree, each of the branch nodes transmits the next message.

As another example of conventional techniques, Japanese Patent Application laid open No. H06-103482 has disclosed a "Data Collecting Device". The data collecting device accurately collects the data of physical quantity detected by respective sensors of sensor devices, each having a communication function, distributed and arranged in specific areas at a center unit by radio waves with small power.

In a sensor network intended for an outdoor setting to collect data (e.g. environmental data) as in the conventional techniques exemplified above, each module has no power supply from outside and works on a solar battery. Consequently, there is little chance that the module receives a sufficient supply of power. For this reason, it has been required to reduce electric power consumption by the module.

SUMMARY OF THE INVENTION

It is therefore an object of the present invention to provide a data collection system and a data collection method in a sensor network, enabling sensor modules to consume lower amounts of power.

In accordance with an aspect of the present invention, to achieve the object mentioned above, there is provided a data collection system comprising a base station, at least one upstream module being directly subordinate to the base station, and at least one downstream module being directly subordinate to the upstream module, which are connected via a network, wherein the base station includes: a section for transmitting a first data collection request signal containing identification (ID) of the base station to the upstream module; a section for receiving a second data collection acknowledgement signal from the upstream module, the second data collection acknowledgement signal containing ID of the upstream module and measured data obtained by each module; and a section for compiling the measured data, the upstream module includes: a section for receiving the first data collection request signal from the base station; a section for transmitting a second data collection request signal containing the ID of the upstream module to the downstream module; a section for obtaining measured data through a sensor; and a section for transmitting the measured data to the base station as the second data collection acknowledgement signal, and the downstream module includes: a section for receiving the second data collection request signal from the upstream module; a section for obtaining measured data through a sensor; and a section for transmitting the measured data to the upstream module as a first data collection acknowledgement signal. The second data collection request signal is transmitted to the base station simultaneously with the transmission of the second data collection request signal to the downstream module, and the base station regards the second data collection request signal as acknowledgement (ACK) for the first data collection request signal. When receiving the first data collection acknowledgement signal, the upstream module regards the first data collection acknowledgement signal as ACK for the second data collection request signal. The second data collection acknowledgement signal is transmitted to the downstream module simultaneously with the transmission of the second data collection acknowledgement signal to the base station, and the downstream module regards the second data collection acknowledgement signal as ACK for the first data collection acknowledgement signal.

Each of the base station, upstream module and downstream module may retain routing information.

Each of the base station, upstream module and downstream module may be provided with a receive wait timer.

In the case where a time-out occurs when the base station waits for ACK from the upstream module which is directly subordinate to the base station as a reply to the first data collection request signal, the base station may retransmit the first data collection request signal to the upstream module.

In the case where a time-out occurs when the base station waits for the second data collection acknowledgement signal from the upstream module, the base station may send a data collection acknowledgement signal retransmission request to the upstream module.

In the case where a time-out occurs when the upstream module waits for ACK from the downstream module as a reply to the second data collection request signal, the upstream module may retransmit the second data collection request signal to the downstream module.

In the case where a time-out occurs when the upstream module waits for the first data collection acknowledgement signal from the downstream module, the upstream module may send a data collection acknowledgement signal retransmission request to the downstream module.

When the upstream and downstream modules complete prescribed process, the modules may enter standby mode.

In the case where a time-out occurs when the upstream module waits for ACK from the base station as a reply to the second data collection acknowledgement signal, the upstream module may enter standby mode.

When the upstream module does not receive the data collection acknowledgement signal retransmission request from the base station for a fixed period of time, a time-out may occur, and the upstream module may enter standby mode.

The base station may explicitly indicate the completion of data collecting by transmitting a data collection completion signal to the upstream module which is directly subordinate to the base station so that the upstream module enters standby mode immediately after the base station has completed data collecting.

The network may have a structure selected from a tree structure, a linear structure and a ring structure.

In accordance with another aspect of the present invention, there is provided a data collection system for a network capable of broadcasting, comprising three or more multiprocessors which are connected through a bus, wherein a first multiprocessor includes a section for outputting a first processing request signal to a second multiprocessor, the second multiprocessor includes a section for performing prescribed process, and outputting a second processing request signal to a third multiprocessor, and the first multiprocessor regards the second processing request signal as ACK for the first processing request signal.

In accordance with yet another aspect of the present invention, there is provided a data collection method for a data collection system comprising a base station, at least one upstream module being directly subordinate to the base station, and at least one downstream module being directly subordinate to the upstream module, which are connected via a network. According to the data collection method, the base station transmits a first data collection request signal containing ID of the base station to the upstream module. The upstream module receives the first data collection request signal, and verifies whether ID of the source of the first data collection request signal contained in the signal matches ID of the base station from routing information retained by the upstream module. The upstream module starts performing measurements or monitoring to obtain measured data in response to the first data collection request signal as a trigger, and transmits a second data collection request signal containing ID of the upstream module to the downstream module. The second data collection request signal is transmitted to the base station simultaneously with the transmission of the second data collection request signal to the downstream module, and the base station regards the second data collection request signal as ACK for the first data collection request signal. On receipt of the second data collection request signal, the downstream module verifies whether ID of the source of the second data collection request signal contained in the signal matches ID of the upstream module from routing information retained by the downstream module, and starts performing measurements or monitoring to obtain measured data. After completing the measurements or monitoring, the downstream module transmits a first data collection acknowledgement signal containing ID of the downstream module and the measured data obtained by the downstream module to the upstream module. When receiving the first data collection acknowledgement signal from the downstream module based on the routing information, the upstream module regards the first data collection acknowledgement signal as ACK for the second data collection request signal. The upstream module produces a second data collection acknowledgement signal containing the measured data obtained by the upstream and downstream modules and the ID of the upstream module, and transmits the second data collection acknowledgement signal to the base station. Simultaneously with the transmission of the second data collection acknowledgement signal to the base station, the downstream module receives the second data collection acknowledgement signal. When receiving the second data collection acknowledgement signal, the downstream module regards the second data collection acknowledgement signal as ACK for the first data collection acknowledgement signal, and enters standby mode to reduce electric power consumption.

BRIEF DESCRIPTION OF THE DRAWINGS

The objects and features of the present invention will become more apparent from the consideration of the following detailed description taken in conjunction with the accompanying drawings in which:

FIG. 1 is a diagram showing an image of the construction of a data collection system according to the first embodiment of the present invention;

FIG. 2 is a diagram showing examples of routing information according to the first embodiment of the present invention;

DESCRIPTION OF THE PREFERRED EMBODIMENT

Figure 3:
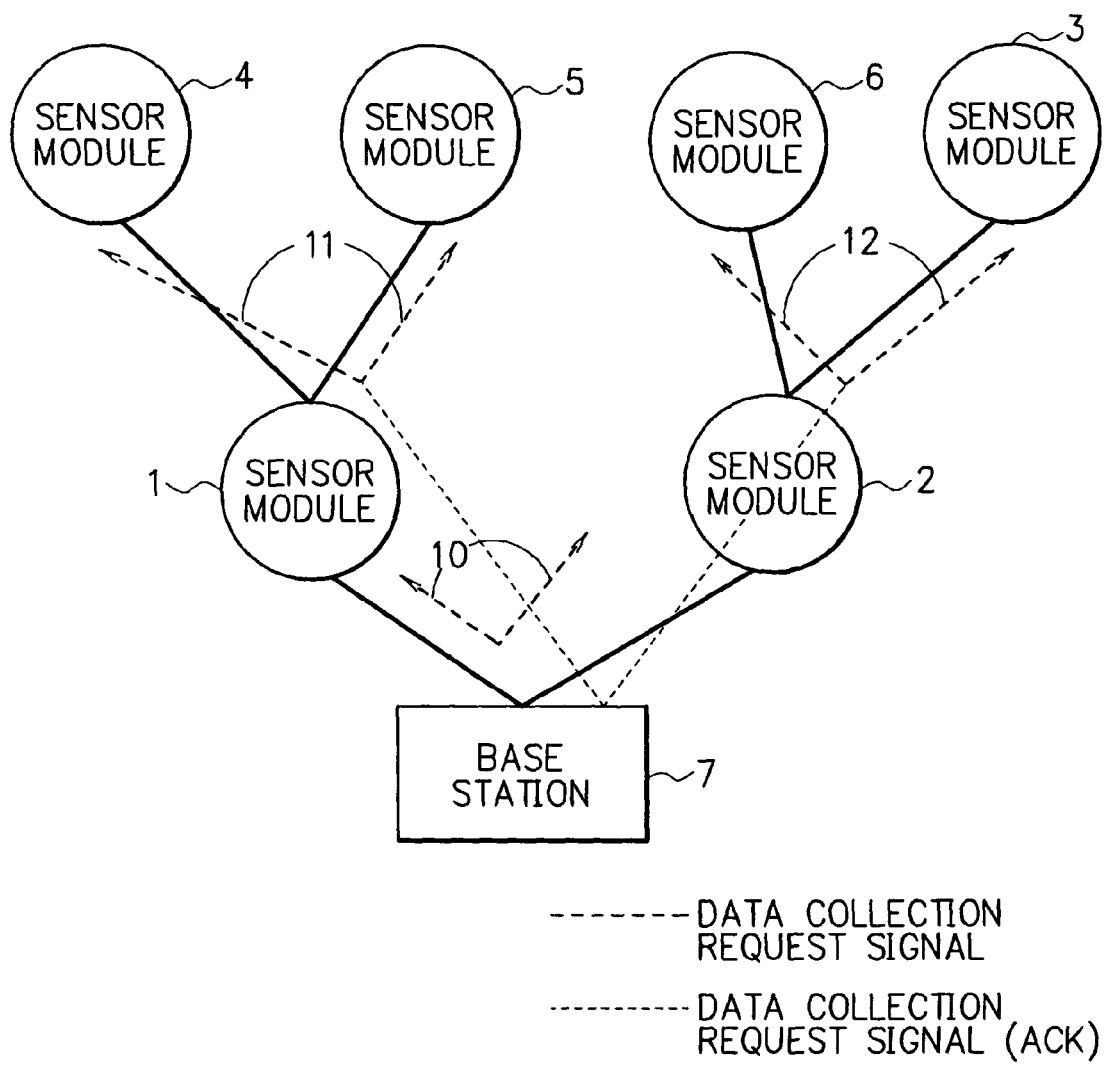
FIG. 3 is a diagram showing an example of the flow of data in the data collection system depicted in FIG. 1.

Referring now to the drawings, a description of a preferred embodiment of the present invention will be given in detail.

First, characteristics of the present invention will be described referring to FIG. 1.

In a network as shown in FIG. 1, data are relayed by a communication medium such as radio capable of broadcasting. Referring to FIG. 1, the network is formed with sensor modules 1 to 6 and a base station 7. The base station 7 simultaneously transmits signals to the sensor modules 1 and 2. Besides, the sensor module 1 simultaneously transmits signals to the base station 7 located upstream of the module 1 and the sensor modules 4 and 5 located downstream thereof. Similarly, the sensor module 2 simultaneously transmits signals to the base station 7 located upstream of the module 2 and the sensor modules 3 and 6 located downstream thereof.

The base station 7 transmits data collection request signals to sensor modules which are lower than the base station 7 by 1 in a tree structure. Each sensor module which has received the data collection request signal forwards the signal to one or more downstream sensor modules which are lower than the module by 1. Each of the upstream sensor modules 1 and 2 transmits the signal to the base station 7 simultaneously with the transmission of the signals to the downstream sensor modules 4 and 5 or 3 and 6. The base station 7 regards the signal as acknowledgement (ACK) for the data collection request signal transmitted therefrom to the upstream sensor module 1 or 2.

From a sensor module at the low-order end starts the transmission of a data collection acknowledgement signal. When a sensor module receives the data collection acknowledgement signal from a downstream sensor module which is lower than the module by 1, the module sends the signal to an upstream sensor module which is higher than the module by 1. At the same time, the sensor module transmits the signal to the downstream sensor module which is lower than the module by 1. Having received the signal, the downstream sensor module regards the signal as ACK for the data collection acknowledgement signal transmitted therefrom to the sensor module, and enters standby mode. In this manner, the sensor modules enter standby mode in sequence starting from the sensor module at the low-order end. Thereby, it becomes possible to achieve reductions in the frequency of signal transmission while ensuring reliable data communication. Thus, each module consumes lower amounts of power.

FIG. 1 is a diagram showing the construction of a data collection system according to the first embodiment of the present invention.

The base station 7 has functions for transmitting data collection request signals to one or more sensor modules, receiving data collection acknowledgement signals from the sensor modules which are directly subordinate to the base station 7, and compiling measured data. The data collection request signal includes information such as identification (ID) of the source of the signal. The data collection acknowledgement signal includes information as to ID of the source of the signal and measured data obtained by each module.

The base station 7 is provided with routing information. FIG. 2 (2-7) is a diagram showing an example of the routing information retained by the base station 7.

Additionally, the base station 7 is provided with a receive wait timer. With the use of the receive wait timer, the base station 7 retransmits the data collection request signal to a sensor module which is subordinate to the base station 7 when a time-out occurs while the base station 7 is waiting for the data collection request signal as an ACK signal from the module. Besides, in the case where a time-out occurs while the base station 7 is waiting for the data collection acknowledgement signal from a sensor module which is subordinate to the base station 7, the base station 7 sends the module a request for retransmission of the data collection acknowledgement signal.

Each of the sensor modules 1 to 6 receives the data collection request signal from the base station 7 or an upstream sensor module. Incidentally, the upstream sensor module herein described refers to a module which is higher than each sensor module by 1 in a tree structure. In addition, each of the sensor modules 1 to 6 performs measurements or monitoring to obtain measured data through the use of a sensor. The measured data is sent to the upstream sensor module as the data collection acknowledgement signal.

As is the case with the base station 7, each of the sensor modules 1 to 6 is provided with routing information. FIG. 2 (2-1 to 2-6) shows examples of the routing information retained by the sensor modules 1 to 6.

Each of the sensor modules 1 to 6 is also provided with a receive wait timer. The sensor module (1 to 6) retransmits the data collection request signal to a downstream sensor module when a time-out occurs while the module is waiting for the data collection request signal as an ACK signal from the downstream sensor module. In the case where a time-out occurs while the sensor module (1 to 6) is waiting for the data collection acknowledgement signal from a downstream sensor module, the module sends the downstream sensor module a request for retransmission of the data collection acknowledgement signal. Upon completion of the process, the sensor module (1 to 6) enters standby mode to thereby consume lower amounts of power.

In the case where the sensor module is directly subordinate to the base station and a time-out occurs while the module is waiting for acknowledgment of the base station's receipt of the data collection acknowledgement signal, the module enters standby mode. This means that the base station 7 has received the data collection acknowledgement signal properly and has not transmit a data collection acknowledgement signal retransmission request to each of the sensor modules 1 and 2 which is directly subordinate to the base station 7.

In the following, a description will be made of the operation of the data collection system in a sensor network according to the first embodiment referring to FIGS. 3 to 6.

FIG. 3 is a diagram showing the flow of the data collection request signals from the base station 7. First, the base station 7 transmits the data collection request signals 10 to sensor modules (1 and 2) located downstream thereof. The sensor modules 1 and 2 each verify whether ID of the source of the data collection request signal 10 contained in the signal 10 matches ID of the upstream module from routing information retained by them after receiving the signals 10. The sensor modules 1 and 2 start performing measurements or monitoring to obtain measured data triggered by the data collection request signal 10. Since there are sensor modules (3 to 6) located downstream of the sensor modules 1 and 2, the modules 1 and 2 send them the data collection request signals. More specifically, the sensor module 1 sends the data collection request signals 11 to the sensor modules 4 and 5, while the sensor module 2 sends the data collection request signals 12 to the sensor modules 3 and 6. At the same time, the data collection request signals 11 and 12 are also transmitted to the base station 7. The base station 7 regards these signals as ACK for the data collection request signals 10.

Having received the data collection request signal 11 or 12, each of the sensor modules 3 to 6 verifies whether ID of the source of the data collection request signal contained in the signal matches ID of the upstream module from routing information retained by the module, and then starts performing measurements or monitoring to obtain measured data. The data collection acknowledgement signals from the downstream sensor modules 3 to 6 represent ACK for the data collection request signals 11 and 12.

Figure 4:
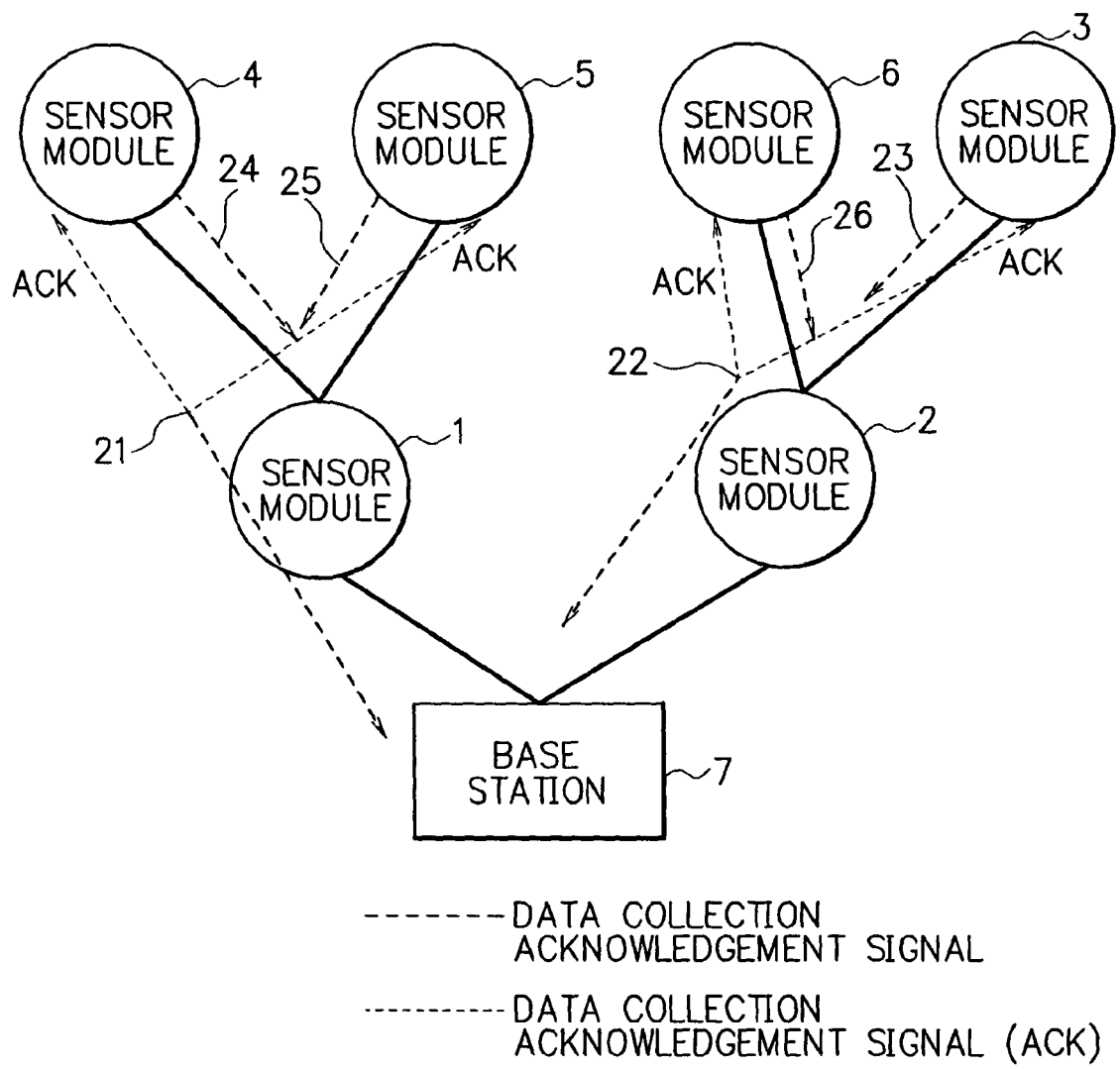
FIG. 4 is a diagram showing another example of the flow of data in the data collection system depicted in FIG. 1.

Next, the flow of the data collection acknowledgement signals will be described. FIG. 4 is a diagram showing the flow of the data collection acknowledgement signals.

After completing the measurements or monitoring, the sensor modules 3 to 6 at the low-order end of a tree transmit the data collection acknowledgement signals 23 to 26, respectively. The data collection acknowledgement signals 24 and 25 from the sensor modules 4 and 5 correspond to ACK for the data collection request signals 11, while the data collection acknowledgement signals 23 and 26 from the sensor modules 3 and 6 correspond to ACK for the data collection request signals 12.

The sensor module 1 receives the data collection acknowledgement signals 24 and 25 from the sensor modules 4 and 5 based on the routing information. In like fashion, the sensor module 2 receives the data collection acknowledgement signals 23 and 26 from the sensor modules 3 and 6.

The sensor module 1 produces the data collection acknowledgement signal 21 by adding the measured data obtained from the sensor modules 4 and 5 to its own measured data. Subsequently, the sensor module 1 simultaneously transmits the data collection acknowledgement signals 21 to the sensor modules 4 and 5 as well as the base station 7. When receiving the data collection acknowledgement signals 21 from the upstream sensor module 1, the sensor modules 4 and 5 regard the signals 21 as ACK for the data collection acknowledgement signals 24 and 25, and enter standby mode to reduce electric power consumption.

Similarly, the sensor module 2 produces the data collection acknowledgement signal 22 by adding the measured data obtained from the sensor modules 3 and 6 to its own measured data, and transmits the signal 22. The data collection acknowledgement signals 22 are received by the sensor modules 3 and 6 simultaneously with the transmission of the signal 22 to the base station 7. Having received the data collection acknowledgement signals 22 from the upstream sensor module 2, the sensor modules 3 and 6 regard the signals 22 as ACK for the data collection acknowledgement signals 23 and 26, and enter standby mode so as to consume lower amounts of power.

When the sensor modules 1 and 2 have not received a data collection acknowledgement signal retransmission request from the base station 7 for more than a fixed period of time, a time-out occurs, and the sensor modules 1 and 2 enter standby mode to reduce electric power consumption.

Figure 5:
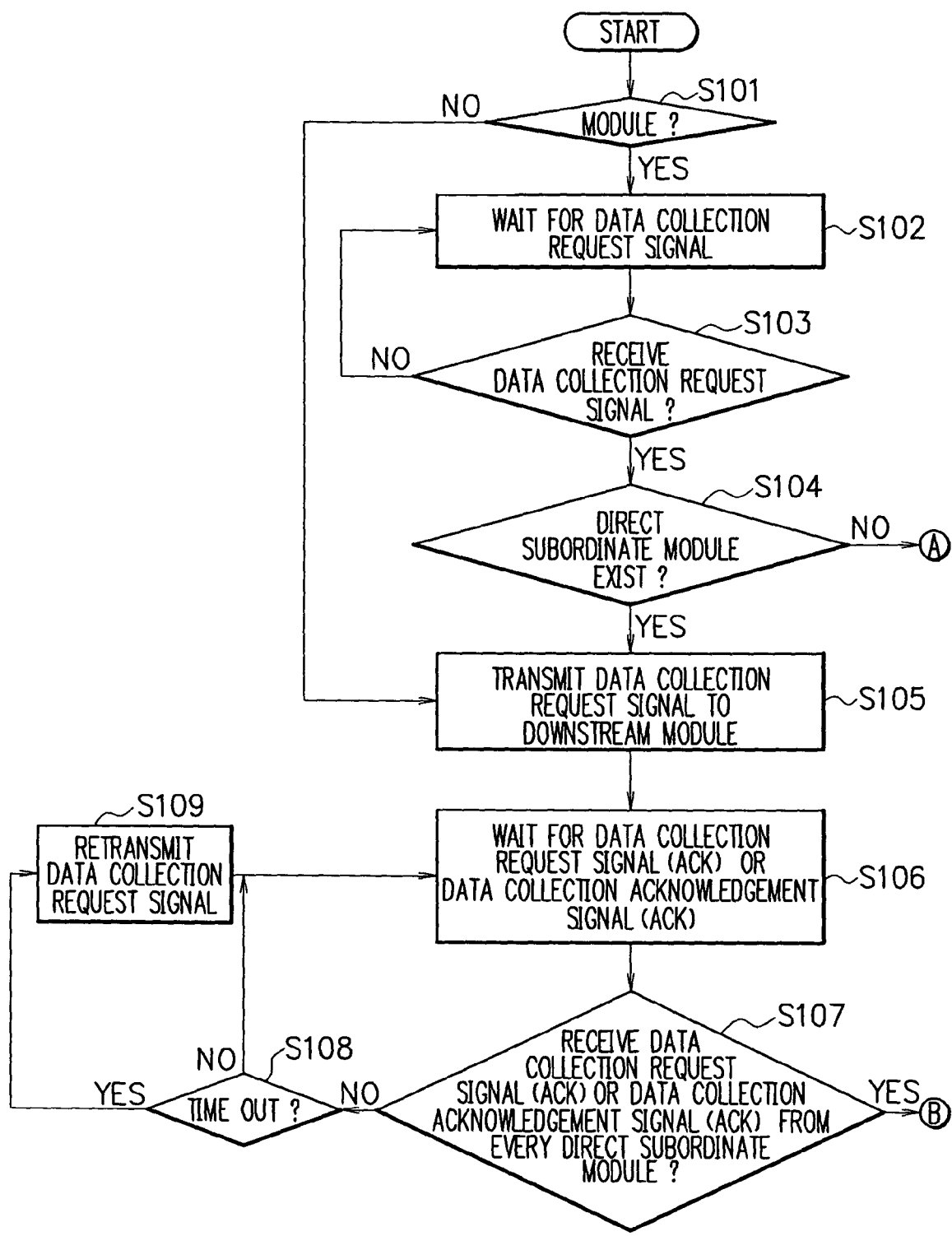
FIG. 5 is a flowchart showing the operation of the data collection system depicted in FIG. 1.
Figure 6:
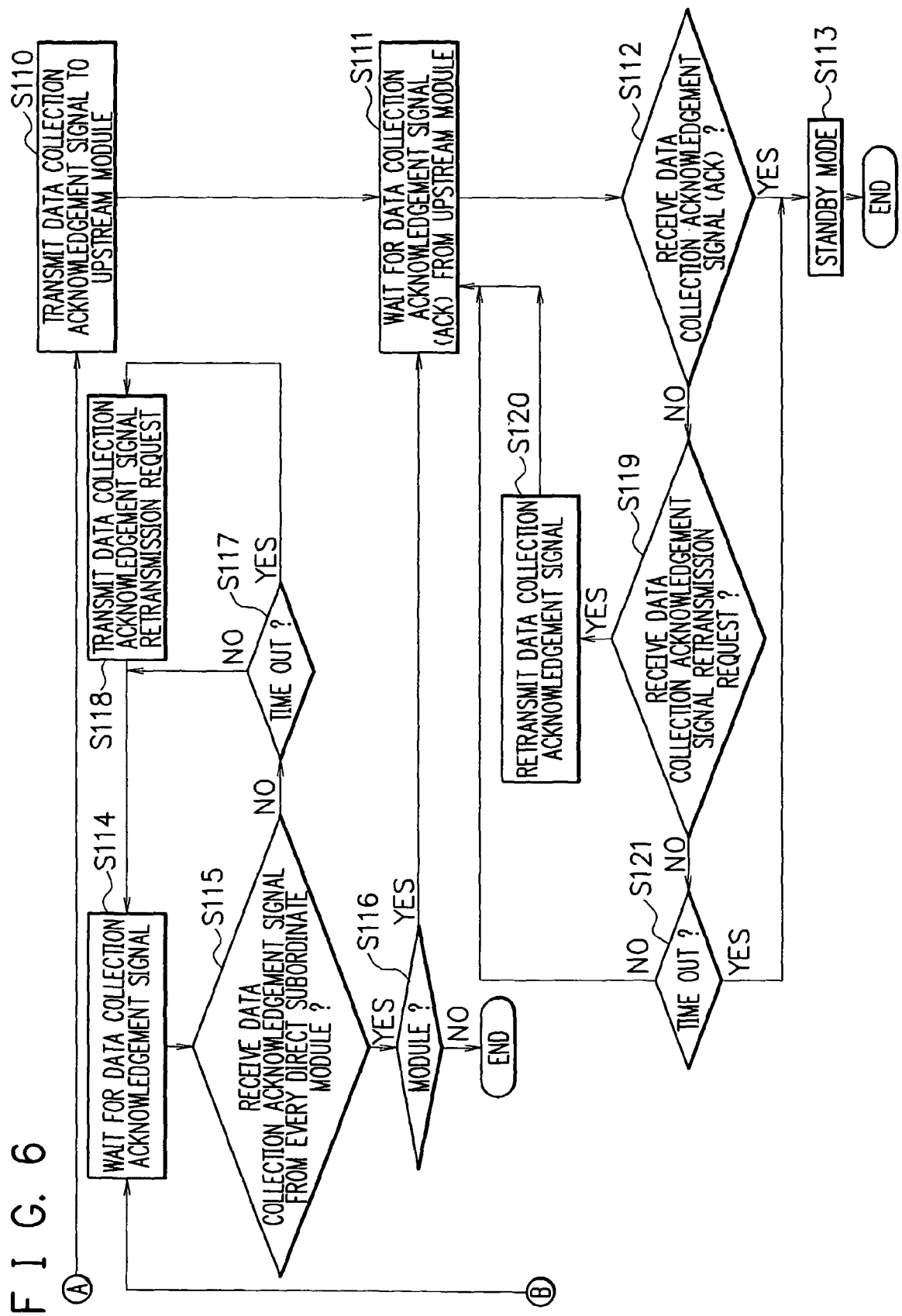
FIG. 6 is a flowchart showing the operation of the data collection system depicted in FIG. 1.

FIGS. 5 and 6 show a flowchart showing the operation of the data collection system of the first embodiment.

In the case of the base station having no upstream module (step S101/NO), the base station transmits the data collection request signal to one or more modules which are directly subordinate to the base station (step S105). In the case of the module having an upstream module (step S101/YES), the module waits for the data collection request signal to be transmitted from the upstream module (step S102). When the module receives the data collection request signal from the upstream module (step S103/YES), if there is at least one downstream module directly subordinate to the module (step S104/YES), the module sends the data collection request signal to the downstream module(s) (step S105).

In the case where there is no downstream module directly subordinate to the module (step S104/NO), the module sends the data collection acknowledgement signal to the upstream module (step S110), and waits for the data collection acknowledgement signal as ACK for the signal sent at step S110 to be transmitted from the upstream module (step S111). Upon receipt of ACK (step S112/YES), the module enters standby mode (step S113).

After having sent the data collection request signal to the downstream module(s) directly subordinate to the module at step S105, the module waits for the data collection request signal or the data collection acknowledgement signal, which corresponds to ACK for the signal sent at step S105, to be transmitted from the downstream module(s) (step S106). If a time-out occurs (step S108/YES) before the module does not receive the data collection request signal or the data collection acknowledgement signal, which corresponds to ACK, from every downstream module directly subordinate to the module (step S107/NO), the module retransmits the data collection request signal (step S109), and waits again for ACK to be transmitted (step S106). If a time-out has not yet occurred (step S108/NO), the module continues to wait for ACK to be transmitted without retransmitting the data collection request signal (step S106).

When the module receives the data collection request signal, which corresponds to ACK, from every downstream module directly subordinate to the module (step S107/YES), the module waits for the data collection acknowledgement signal to be transmitted from the downstream module(s) (step S114). If a time-out occurs (step S117/YES) before the module does not receive the data collection acknowledgement signal from every downstream module directly subordinate to the module (step S115/NO), the module transmits a data collection acknowledgement signal retransmission request (step S118), and waits again for the data collection acknowledgement signal to be transmitted (step S114). If a time-out has not yet occurred (step S117/NO), the module continues to wait for the data collection acknowledgement signal to be transmitted without transmitting the data collection acknowledgement signal retransmission request (step S114).

In the case where the base station (step S116/NO) receives the data collection acknowledgement signal from every module which is directly subordinate to the base station (step S115/YES), the base station terminates the process. In the case where the module (step S116/YES) receives the data collection acknowledgement signal from every downstream module directly subordinate to the module (step S115/YES), the module transmits the data collection acknowledgement signal containing measured data obtained by the module and each downstream module to the upstream module, and waits for the data collection acknowledgement signal, which corresponds to ACK for the signal sent previously, to be transmitted from the upstream module (step S111).

When the module receives the data collection acknowledgement signal as ACK from the upstream module (step S112/YES), the module enters standby mode (step S113), and terminates the process. If the module does not receive ACK from the upstream module (step S112/NO), and receives a data collection acknowledgement signal retransmission request instead (step S119/YES), the module retransmits the data collection acknowledgement signal to the upstream module (step S120), and waits again for the data collection acknowledgement signal as ACK to be transmitted from the upstream module (step S111). If the module has not received the data collection acknowledgement signal retransmission request (step S119/NO) and a time-out has not yet occurred (step S121/NO), the module continues to wait for the data collection acknowledgement signal as ACK to be transmitted from the upstream module (step S111). If a time-out occurs (step S121/YES) without having received the data collection acknowledgement signal retransmission request from the upstream module (step S119/NO), the module enters standby mode (step S113), and terminates the process.

Figure 7:
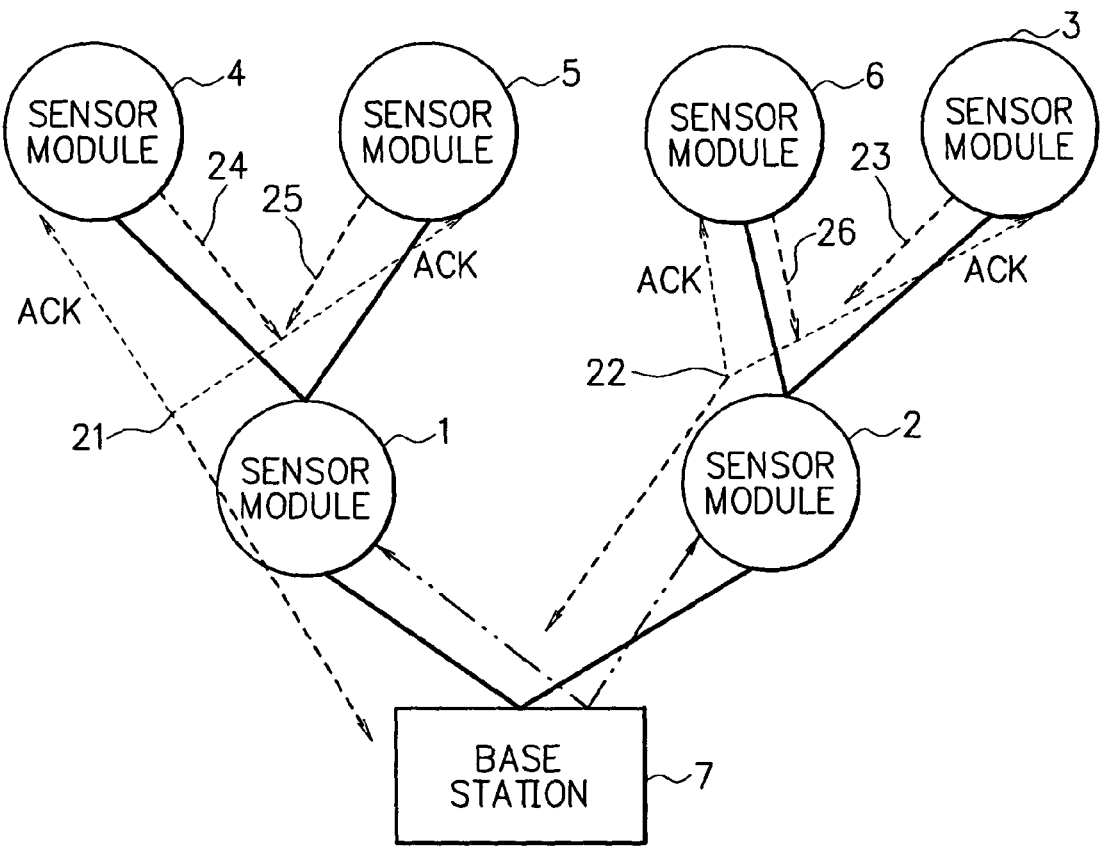
FIG. 7 is a diagram showing an image of the construction of a data collection system and the flow of data in the system according to the second embodiment of the present invention.

FIG. 7 is a diagram showing the construction of a data collection system and the flow of data in the system according to the second embodiment of the present invention. As can be seen in FIG. 7, the data collection system of the second embodiment is of the same construction and operates in basically the same manner as that of the first embodiment described hereinbefore. In the second embodiment, the base station 7 explicitly indicates the completion of data collecting by transmitting a data collection completion signal to the sensor modules 1 and 2 which are directly subordinate to the base station 7. Thereby, the sensor modules 1 and 2 can enter standby mode immediately after the base station 7 has completed data collecting. Thus, it is possible to achieve further reductions in electric power consumption by the modules.

Figure 8:
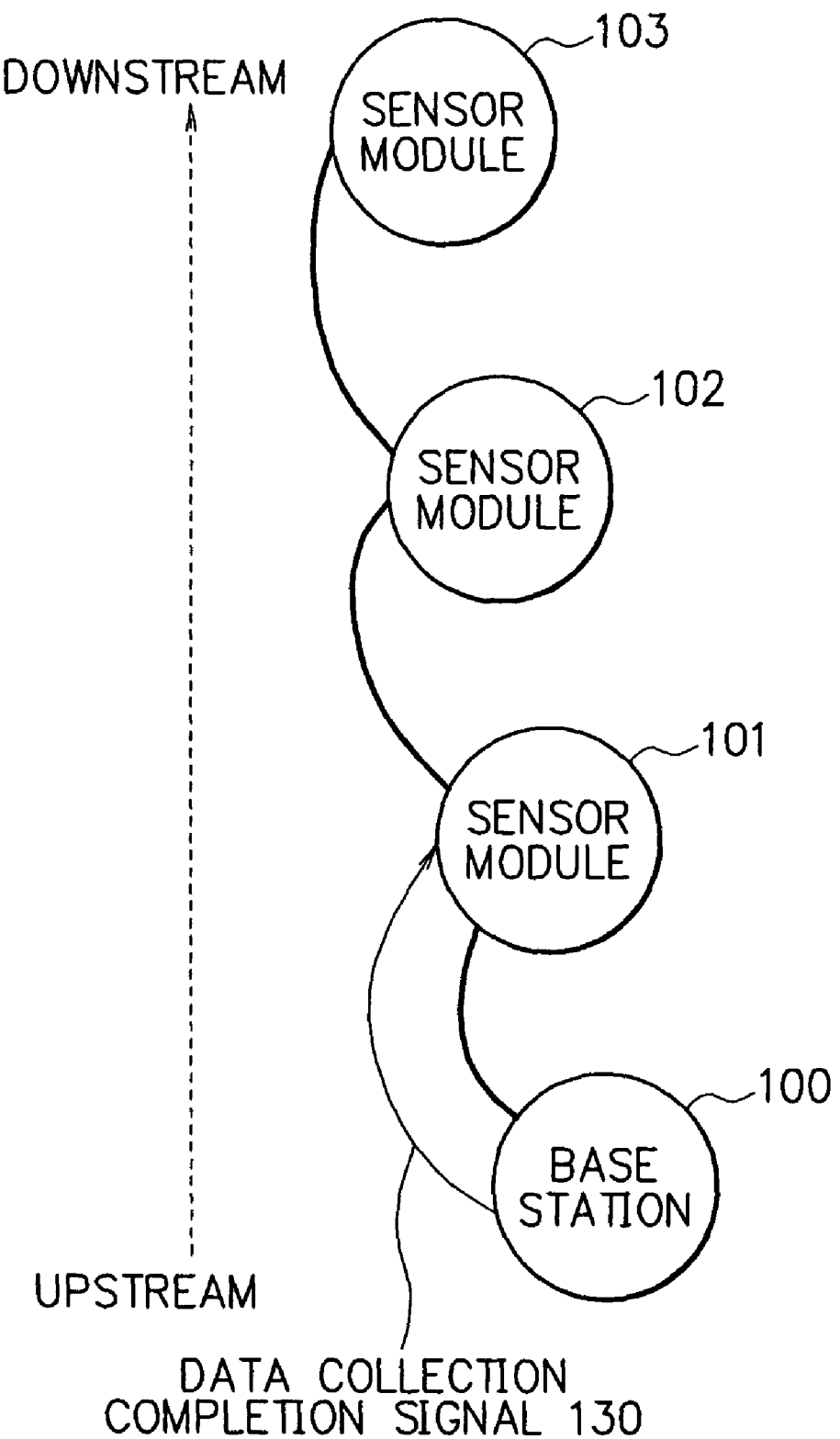
FIG. 8 is a diagram showing an image of the construction of a data collection system according to the third embodiment of the present invention.
Figure 9:
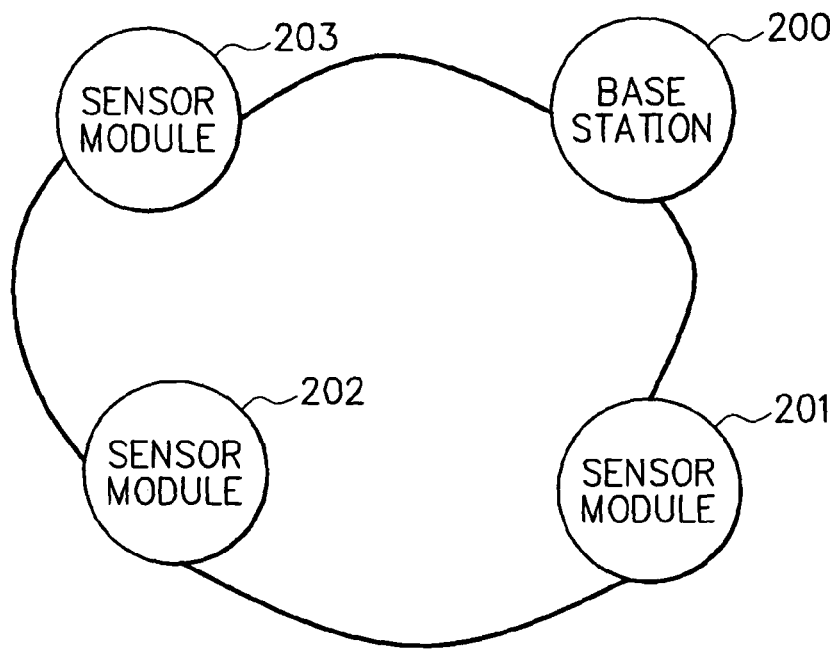
FIG. 9 is a diagram showing another image of the construction of a data collection system according to the third embodiment of the present invention.

FIGS. 8 and 9 show examples of the construction of a data collection system according to the third embodiment of the present invention. The present invention is applicable to a network having a linear structure as shown in FIG. 8 or a ring structure as shown in FIG. 9 as well as a network having a tree structure.

Figure 10:
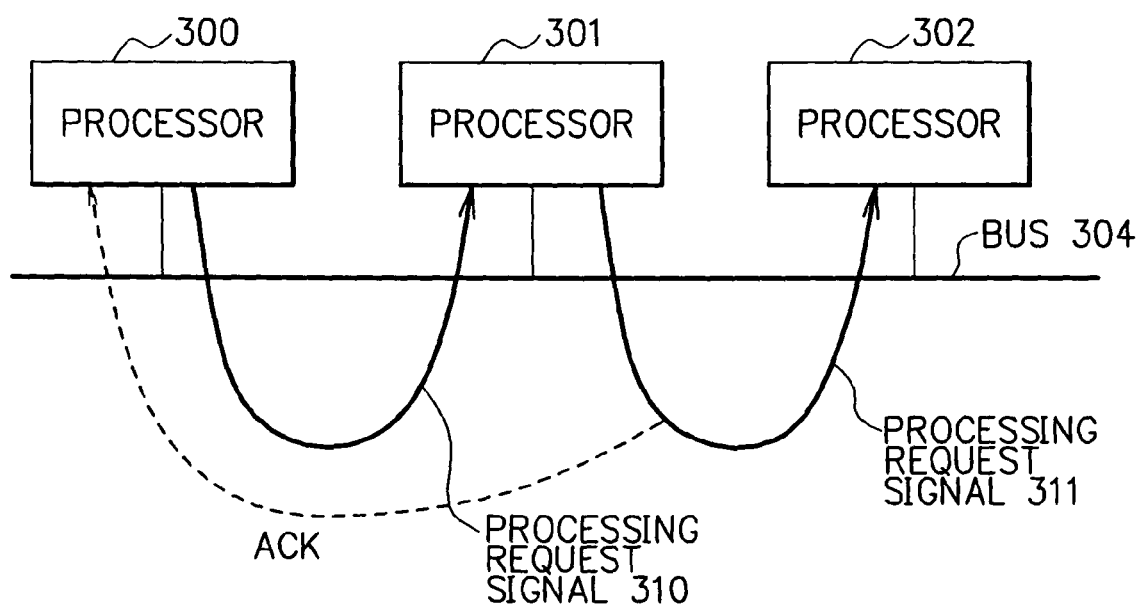
FIG. 10 is a diagram showing an image of the construction of a data collection system and the flow of data in the system according to the fourth embodiment of the present invention.

FIG. 10 is a diagram showing the construction of a data collection system and the flow of data in the system according to the fourth embodiment of the present invention. Referring to FIG. 10, multiprocessors 300, 301 and 302, and a bus 304 for connecting them form a network. The network is capable of broadcasting because of the bus connection between the multiprocessors 300, 301 and 302. The multiprocessor 300 outputs a processing request signal 310 to the multiprocessor 301. The multiprocessor 301 performs prescribed process, and outputs a processing request signal 311 to the multiprocessor 302. The multiprocessor 300 regards the processing request signal 311 as ACK for the processing request signal 310.

As set forth hereinabove, in accordance with the present invention, the upstream module regards the data collection request signal from the downstream module as ACK, which spares the downstream module the trouble of sending the upstream module ACK aside from the data collection request signal. Besides, the downstream module regards the data collection acknowledgement signal from the upstream module as ACK. Therefore, the upstream module is not required to transmit ACK in addition to the data collection acknowledgement signal. Thereby, it is possible to reduce the frequency of signal transmission while maintaining reliable data communication. Thus, each module consumes lower amounts of power.

Moreover, the downstream module enters standby mode after having transmitted measured data to the upstream module and received the data collection acknowledgement signal as ACK from the upstream module. That is, the modules enter standby mode in sequence starting from the sensor module at the low-order end of a tree. Consequently, the time in which each module is active can be minimized. Thus, electric power consumption by each module can be reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A data collection system comprising a base station, at least one upstream module being directly subordinate to the base station, and at least one downstream module being directly subordinate to the upstream module, which are connected via a network, wherein:

the base station includes:
  a section for transmitting a first data collection request signal containing ID of the base station to the upstream module;
  a section for receiving a second data collection acknowledgement signal from the upstream module, the second data collection acknowledgement signal containing ID of the upstream module and measured data obtained by each module; and
  a section for compiling the measured data;

the upstream module includes:
  a section for receiving the first data collection request signal from the base station;
  a section for transmitting a second data collection request signal containing the ID of the upstream module to the downstream module;
  a section for obtaining measured data through a sensor; and
  a section for transmitting the measured data to the base station as the second data collection acknowledgement signal;

the downstream module includes:
  a section for receiving the second data collection request signal from the upstream module;
  a section for obtaining measured data through a sensor; and
  a section for transmitting the measured data to the upstream module as a first data collection acknowledgement signal;

the second data collection request signal is transmitted to the base station simultaneously with the transmission of the second data collection request signal to the downstream module, and the base station regards the second data collection request signal as ACK for the first data collection request signal;

when receiving the first data collection acknowledgement signal, the upstream module regards the first data collection acknowledgement signal as ACK for the second data collection request signal; and the second data collection acknowledgement signal is transmitted to the downstream module simultaneously with the transmission of the second data collection acknowledgement signal to the base station, and the downstream module regards the second data collection acknowledgement signal as ACK for the first data collection acknowledgement signal.

2. The data collection system claimed in claim 1, wherein each of the base station, upstream module and downstream module retains routing information.

3. The data collection system claimed in claim 1, wherein each of the base station, upstream module and downstream module is provided with a receive wait timer.

4. The data collection system claimed in claim 1, wherein each of the base station, upstream module and downstream module retains routing information, and is provided with a receive wait timer.

5. The data collection system claimed in claim 3, wherein in the case where a time-out occurs when the base station waits for ACK from the upstream module which is directly subordinate to the base station as a reply to the first data collection request signal, the base station retransmits the first data collection request signal to the upstream module.

6. The data collection system claimed in claim 4, wherein in the case where a time-out occurs when the base station waits for ACK from the upstream module which is directly subordinate to the base station as a reply to the first data collection request signal, the base station retransmits the first data collection request signal to the upstream module.

7. The data collection system claimed in claim 3, wherein in the case where a time-out occurs when the base station waits for the second data collection acknowledgement signal from the upstream module, the base station sends a data collection acknowledgement signal retransmission request to the upstream module.

8. The data collection system claimed in claim 4, wherein in the case where a time-out occurs when the base station waits for the second data collection acknowledgement signal from the upstream module, the base station sends a data collection acknowledgement signal retransmission request to the upstream module.

9. The data collection system claimed in claim 3, wherein in the case where a time-out occurs when the upstream module waits for ACK from the downstream module as a reply to the second data collection request signal, the upstream module retransmits the second data collection request signal to the downstream module.

10. The data collection system claimed in claim 4, wherein in the case where a time-out occurs when the upstream module waits for ACK from the downstream module as a reply to the second data collection request signal, the upstream module retransmits the second data collection request signal to the downstream module.

11. The data collection system claimed in claim 3, wherein in the case where a time-out occurs when the upstream module waits for the first data collection acknowledgement signal from the downstream module, the upstream module sends a data collection acknowledgement signal retransmission request to the downstream module.

12. The data collection system claimed in claim 4, wherein in the case where a time-out occurs when the upstream module waits for the first data collection acknowledgement signal from the downstream module, the upstream module sends a data collection acknowledgement signal retransmission request to the downstream module.

13. The data collection system claimed in claim 1, wherein when the upstream module and the downstream module complete a prescribed process, the upstream module and the downstream module enter a standby mode.

14. The data collection system claimed in claim 2, wherein when the upstream module and the downstream module complete a prescribed process, the upstream module and the downstream module enter a standby mode.

15. The data collection system claimed in claim 3, wherein when the upstream module and the downstream module complete a prescribed process, the upstream module and the downstream module enter a standby mode.

16. The data collection system claimed in claim 4, wherein when the upstream module and the downstream module complete a prescribed process, the upstream module and the downstream module enter a standby mode.

17. The data collection system claimed in claim 3, wherein in the case where a time-out occurs when the upstream module waits for ACK from the base station as a reply to the second data collection acknowledgement signal, the upstream module enters a standby mode.

18. The data collection system claimed in claim 4, wherein in the case where a time-out occurs when the upstream module waits for ACK from the base station as a reply to the second data collection acknowledgement signal, the upstream module enters a standby mode.

19. The data collection system claimed in claim 3, wherein when the upstream module does not receive the data collection acknowledgement signal retransmission request from the base station for a fixed period of time, a time-out occurs, and the upstream module enters a standby mode.

20. The data collection system claimed in claim 4, wherein when the upstream module does not receive the data collection acknowledgement signal retransmission request from the base station for a fixed period of time, a time-out occurs, and the upstream module enters a standby mode.

21. The data collection system claimed in claim 3, wherein:
in the case where a time-out occurs when the base station waits for ACK from the upstream module as a reply to the first data collection request signal, the base station retransmits the first data collection request signal to the upstream module;
in the case where a time-out occurs when the base station waits for the second data collection acknowledgement signal from the upstream module, the base station sends a data collection acknowledgement signal retransmission request to the upstream module;
in the case where a time-out occurs when the upstream module waits for ACK from the downstream module as a reply to the second data collection request signal, the upstream module retransmits the second data collection request signal to the downstream module;
in the case where a tune-out occurs when the upstream module waits for the first data collection acknowledgement signal from the downstream module, the upstream module sends a data collection acknowledgement signal retransmission request to the downstream module;
when the upstream module and the downstream module complete a prescribed process, the upstream module and the downstream module enter a standby mode;
in the case where a time-out occurs when the upstream module waits for ACK from the base station as a reply to the second data collection acknowledgement signal, the upstream module enters the standby mode; and
when the upstream module does not receive the data collection acknowledgement signal retransmission request from the base station for a fixed period of time, a time-out occurs, and the upstream module enters the standby mode.

22. The data collection system claimed in claim 4, wherein:
in the case where a time-out occurs when the base station waits for ACK from the upstream module as a reply to the first data collection request signal, the base station retransmits the first data collection request signal to the upstream module;
in the case where a time-out occurs when the base station waits for the second data collection acknowledgement signal from the upstream module, the base station sends a data collection acknowledgement signal retransmission request to the upstream module;
in the case where a time-out occurs when the upstream module waits for ACK from the downstream module as a reply to the second data collection request signal, the upstream module retransmits the second data collection request signal to the downstream module;
in the case where a time-out occurs when the upstream module waits for the first data collection acknowledgement signal from the downstream module, the upstream module sends a data collection acknowledgement signal retransmission request to the downstream module;
when the upstream module and the downstream module complete a prescribed process, the upstream module and the downstream module enter a standby mode;
in the case where a time-out occurs when the upstream module waits for ACK from the base station as a reply to the second data collection acknowledgement signal, the upstream module enters the standby mode; and
when the upstream module does not receive the data collection acknowledgement signal retransmission request from the base station for a fixed period of time, a time-out occurs, and the upstream module enters the standby mode.

23. The data collection system claimed in claim 1, wherein the base station explicitly indicates a completion of data collecting by transmitting a data collection completion signal to the upstream module which is directly subordinate to the base station so that the upstream module enters a standby mode immediately after the base station has completed data collecting.

24. The data collection system claimed in claim 1, wherein the network have a structure selected from a tree structure, a linear structure and a ring structure.

25. A data collection method for a data collection system comprising a base station, at least one upstream module being directly subordinate to the base station, and at least one downstream module being directly subordinate to the upstream module, which are connected via a network, comprising:
a step at which the base station transmits a first data collection request signal containing ID of the base station to the upstream module;
a step at which the upstream module receives the first data collection request signal, and verifies whether ID of the source of the first data collection request signal contained in the signal matches ID of the base station from routing information retained by the upstream module;
a step at which the upstream module starts performing measurements to obtain measured data triggered by the first data collection request signal, and transmits a second data collection request signal containing ID of the upstream module to the downstream module;
a step at which the second data collection request signal is transmitted to the base station simultaneously with the transmission of the second data collection request signal to the downstream module, and the base station regards the second data collection request signal as ACK for the first data collection request signal;

a step at which, on receipt of the second data collection request signal, the downstream module verifies whether ID of the source of the second data collection request signal contained in the signal matches ID of the upstream module from routing information retained by the downstream module, and starts performing measurements to obtain measured data;

a step at which, after completing the measurements, the downstream module sends the upstream module a first data collection acknowledgement signal containing ID of the downstream module and the measured data obtained by the downstream module;

a step at which, when receiving the first data collection acknowledgement signal from the downstream module based on the routing information, the upstream module regards the first data collection acknowledgement signal as ACK for the second data collection request signal;

a step at which the upstream module produces a second data collection acknowledgement signal containing the measured data obtained by the downstream module in addition to the measured data obtained by the upstream module and the ID of the upstream module, and transmits the second data collection acknowledgement signal to the base station;

a step at which, simultaneously with the transmission of the second data collection acknowledgement signal to the base station, the downstream module receives the second data collection acknowledgement signal; and a step at which, having received the second data collection acknowledgement signal, the downstream module regards the second data collection acknowledgement signal as ACK for the first data collection acknowledgement signal, and enters a standby mode to reduce electric power consumption.

26. The data collection method claimed in claim 25, wherein each of the base station, upstream module and downstream module is provided with a receive wait timer.

27. The data collection method claimed in claim 26, wherein in the case where a time-out occurs when the base station waits for ACK from the upstream module which is directly subordinate to the base station as a reply to the first data collection request signal, the base station retransmits the first data collection request signal to the upstream module.

28. The data collection method claimed in claim 26, wherein in the case where a time-out occurs when the base station waits for the second data collection acknowledgement signal from the upstream module, the base station sends a data collection acknowledgement signal retransmission request to the upstream module.

29. The data collection method claimed in claim 26, wherein in the case where a time-out occurs when the upstream module waits for ACK from the downstream module as a reply to the second data collection request signal, the upstream module retransmits the second data collection request signal to the downstream module.

30. The data collection method claimed in claim 26, wherein in the case where a time-out occurs when the upstream module waits for the first data collection acknowledgement signal from the downstream module, the upstream module sends a data collection acknowledgement signal retransmission request to the downstream module.

31. The data collection method claimed in claim 25, wherein when the upstream module and the downstream module complete a prescribed process, the upstream module and the downstream module enter the standby mode.

32. The data collection method claimed in claim 26, wherein when the upstream module and the downstream module complete a prescribed process, the upstream module and the downstream module enter the standby mode.

33. The data collection method claimed in claim 26, wherein in the case where a time-out occurs when the upstream module waits for ACK from the base station as a reply to the second data collection acknowledgement signal, the upstream module enters the standby mode.

34. The data collection method claimed in claim 26, wherein when the upstream module does not receive the data collection acknowledgement signal retransmission request from the base station for a fixed period of time, a time-out occurs, and the upstream module enters the standby mode.

35. The data collection method claimed in claim 26, wherein:
in the case where a time-out occurs when the base station waits for ACK from the upstream module as a reply to the first data collection request signal, the base station retransmits the first data collection request signal to the upstream module;
in the case where a time-out occurs when the base station waits for the second data collection acknowledgement signal from the upstream module, the base station sends a data collection acknowledgement signal retransmission request to the upstream module;
in the case where a time-out occurs when the upstream module waits for ACK from the downstream module as a reply to the second data collection request signal, the upstream module retransmits the second data collection request signal to the downstream module;
in the case where a time-out occurs when the upstream module waits for the first data collection acknowledgement signal from the downstream module, the upstream module sends a data collection acknowledgement signal retransmission request to the downstream module;
when the upstream module and the downstream module complete a prescribed process, the upstream module and the downstream module enter the standby mode;
in the case where a time-out occurs when the upstream module waits for ACK from the base station as a reply to the second data collection acknowledgement signal, the upstream module enters the standby mode; and
when the upstream module does not receive the data collection acknowledgement signal retransmission request from the base station for a fixed period of time, a time-out occurs, and the upstream module enters the standby mode.

36. The data collection method claimed in claim 25, wherein the base station explicitly indicates a completion of data collecting by transmitting a data collection completion signal to the upstream module which is directly subordinate to the base station so that the upstream module enters the standby mode immediately after the base station has completed data collecting.

37. The data collection method claimed in claim 25, wherein the network have a structure selected from a tree structure, a linear structure and a ring structure.

* * * * *